(12) United States Patent
Mirjafari et al.

(10) Patent No.: US 10,095,296 B2
(45) Date of Patent: Oct. 9, 2018

(54) MULTI-PARAMETER CURRENT SHARING

(71) Applicant: Dell Products, L.P., Round Rock, TX (US)

(72) Inventors: Mehran Mirjafari, Austin, TX (US); Mark A. Muccini, Georgetown, TX (US); Lei Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 155 days.

(21) Appl. No.: 15/287,518

(22) Filed: Oct. 6, 2016

(65) Prior Publication Data
US 2018/0101213 A1  Apr. 12, 2018

(51) Int. Cl.
G06F 9/00 (2006.01)
G06F 1/32 (2006.01)
G06F 1/20 (2006.01)

(52) U.S. Cl.
CPC .......... G06F 1/3206 (2013.01); G06F 1/206 (2013.01); G06F 1/3296 (2013.01)

(58) Field of Classification Search
CPC ....... G06F 1/3206; G06F 1/206; G06F 1/3296
USPC ................ 713/300; 700/298; 307/24, 29
See application file for complete search history.

(56) References Cited

U.S. PATENT DOCUMENTS

| 2006/0082222 | A1* | 4/2006 | Pincu | H02J 1/102 307/29 |
| 2007/0050644 | A1* | 3/2007 | Merkin | G06F 1/206 713/300 |
| 2011/0083021 | A1* | 4/2011 | Floyd | G06F 1/3203 713/300 |
| 2014/0086279 | A1* | 3/2014 | Cao | G01K 1/026 374/183 |
| 2014/0252853 | A1* | 9/2014 | Meunier | H03K 19/0008 307/24 |
| 2015/0012151 | A1* | 1/2015 | Park | G05B 15/02 700/298 |
| 2015/0198987 | A1* | 7/2015 | Park | G06F 1/26 713/300 |
| 2015/0381237 | A1* | 12/2015 | Griffith | H04B 3/546 375/258 |
| 2017/0168536 | A1* | 6/2017 | Choi | G06F 1/28 |

* cited by examiner

Primary Examiner — Aurel Prifti
(74) Attorney, Agent, or Firm — Fogarty LLP

(57) ABSTRACT

Systems and methods for providing multi-parameter current sharing are described. In some embodiments, a system may include an Information Handling System (IHS) and a plurality of Power Supply Unit (PSU) coupled to the IHS in a parallel configuration, a given PSU configured to: receive an indication of an output current provided by the given PSU and available to the IHS via a power transmission interface; and modify the output current using a current sharing signal calculated based upon two or more parameters of the system.

12 Claims, 4 Drawing Sheets

MULTI-PARAMETER CURRENT SHARING

FIELD

This disclosure relates generally to Information Handling Systems (IHSs), and more specifically, to systems and methods for providing multi-parameter current sharing.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In many implementations, an IHS may include two or more Power Supply Units (PSUs) that operate in parallel to provide electrical power to the IHS. In such an environment, power supply current sharing is a widely used practice.

Conventional current sharing systems distribute load current and power dissipation among the various PSUs in the IHS, thus resulting in a balanced current delivery to other IHS components through the PSUs' main output rail. Current sharing based on output current has been used, for example, to help with balancing PSUs configurations, to prevent overcurrent conditions on a single PSU when the load is greater than a single PSU's capacity, and to prevent a PSU from operating above its rated limit (but below its overcurrent set point).

The inventors hereof have observed, however, that conventional current sharing techniques are normally specified and designed to comply with dynamic and/or static accuracy requirements that are based on output current only. To address these, and other concerns, the inventors hereof have developed systems and methods for providing multi-parameter current sharing, as described herein.

SUMMARY

Embodiments of systems and methods for providing multi-parameter current sharing are described herein. In an illustrative, non-limiting embodiment, a system may include an Information Handling System (IHS) and a plurality of Power Supply Unit (PSU) coupled to the IHS in a parallel configuration, a given PSU configured to: receive an indication of an output current provided by the given PSU and available to the IHS via a power transmission interface; and modify the output current using a current sharing signal calculated based upon two or more parameters of the system.

In some cases, the first parameter may include the output current. The first parameter may be multiplied by a first weighting factor. Additionally or alternatively, a second parameter may include an error between an output voltage of the given PSU and a reference voltage internal to the given PSU. The second parameter may be multiplied by a second weighting factor different from the first weighting factor. Additionally or alternatively, a third parameter may include an error between an input current of the given PSU and a reference current internal to the given PSU. The third parameter may be multiplied by a third weighting factor different from the first and second weighting factors. Additionally or alternatively, a fourth parameter may include an error between a temperature within the IHS and a reference temperature. The fourth error may be multiplied by a fourth weighting factor different from the first, second, and third weighting factors. Moreover, the given PSU may be further configured to apply a low-pass filter to at least one of the parameters.

In another illustrative, non-limiting embodiment, a memory storage device may have program instructions stored thereon that, upon execution by a logic circuit within a PSU of an IHS, cause the PSU to perform one or more multi-parameter current sharing operations. In yet another illustrative, non-limiting embodiment, a method may be performed by a controller within a PSU of an IHS that involves one or more multi-parameter current sharing operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Existing current sharing techniques are based on output current only. The inventors have observed that, even when the current share error between various Power Supply Units (PSUs) in an Information Handling System (IHS) is significantly reduced or minimized, the amount of imbalance seen at the input side of the PSUs can still be over 10%.

Moreover, over the past decade, there has been a significant increase in power and compute density in enterprise class products not only at the node level, but also at the rack and data center level. With both power and compute density increasing, the inventors hereof have determined that an emphasis on efficiency and reducing stranded power (e.g., power that is under-utilized or not used by a datacenter to support IHS equipment, which can be a direct result of an unbalanced 3 phase distribution) has become a critical parameter in managing power at the datacenter level. Furthermore, the temperature balance between PSUs is also important.

The slow rising of voltage (walk up) is another recurring problem identified by the inventors as the result of conventional current sharing methods. This problem may occur due to current oscillations (e.g., in the case of master/slave current sharing) or offsets in analog circuits (e.g., in the case of average current sharing). It results in the output voltage of the PSUs slowly walking up to the maximum value, and, in turn, losing their current sharing capability. As determined by the inventors, a conventional current sharing loop does not have any output voltage information, and therefore, is "unaware" that the output voltage is drifting away.

Again, conventional current sharing methods typically use output current information only. This may result in unintended consequences of current sharing loop, such as voltage walkup or non-optimal current balance on the input side. To address these, and other concerns, the inventors hereof have developed systems and methods for providing multi-parameter current sharing, as described herein. For example, models and techniques described herein utilize other parameters such as output voltage and input current in the current sharing loop.

Figure 1:
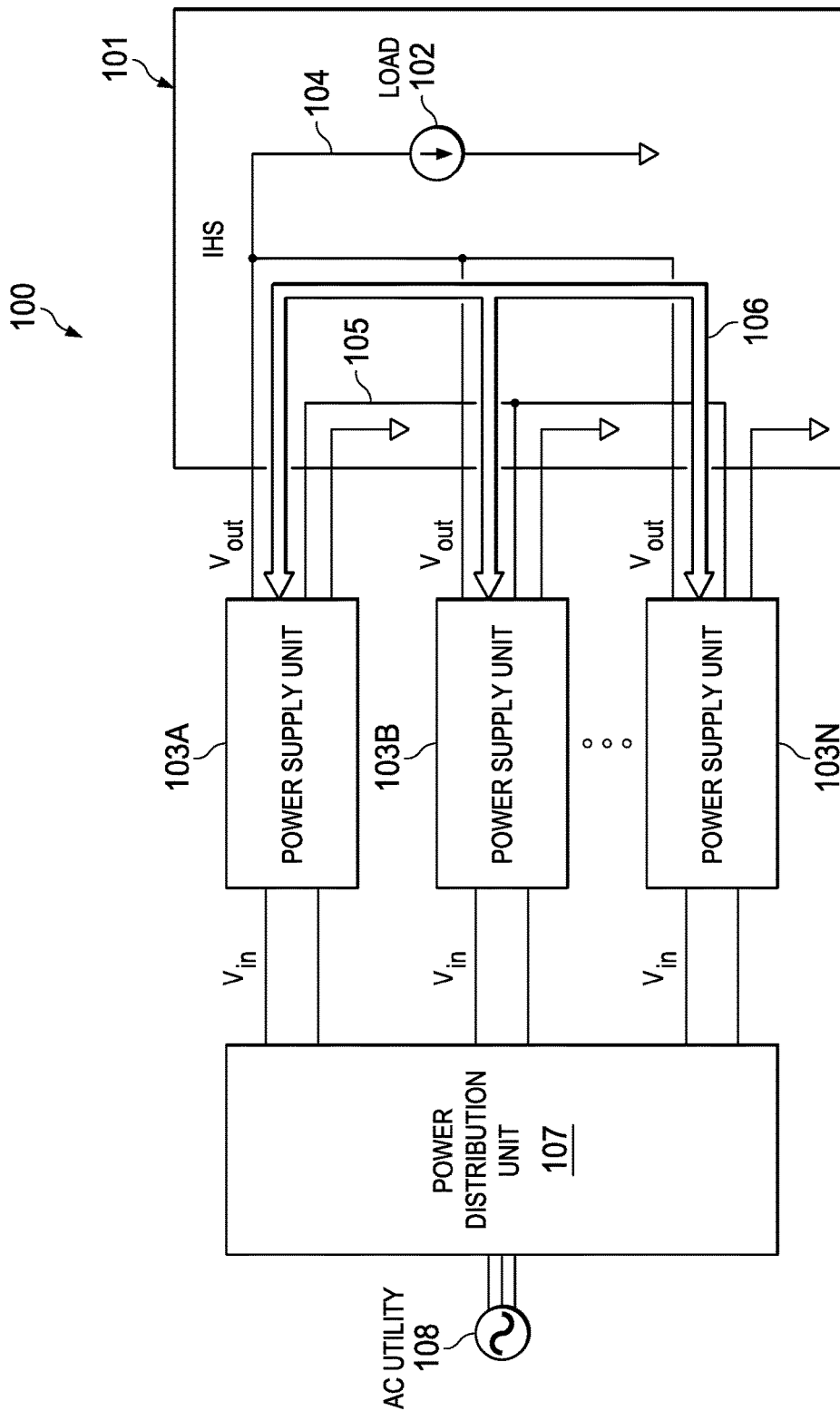
FIG. 1 is a block diagram of an example of a system for enabling multi-parameter current sharing between Power Supply Units (PSUs) in an Information Handling System (IHS) according to some embodiments.

FIG. 1 is a block diagram of an example of system 100 for enabling multi-parameter current sharing between PSUs 103-N coupled to or part of IHS 101, according to some embodiments. In various embodiments, 3-phase AC utility 108 (e.g., 208 V) is connected to an Uninterruptable Power Supply (UPS) or directly dropped into an IHS rack (or row of racks depending on the distribution model), not shown. Power is then distributed amongst the individual pieces of equipment (e.g., other IHSs) via Power Distribution Unit (PDU) 107. The PDU 107 can be configured to provide all three phases to enable an end-user to balance the distribution. If the phases are distributed evenly amongst the rack or row of IHS equipment and running similar workloads, then all phases should be moderately balanced (if loads are also balanced).

PDU 107 is coupled to IHS 101 such that the AC feed ($V_{in}$), is provided to PSUs 103-N. The electrical load presented by IHS 101 is symbolically represented by load 102, which is coupled to each of PSUs 103-N via power transmission interface or bus 104. As such, each of PSUs 103-N perform one or more voltage regulation operations that transform input voltage $V_{in}$ into output voltage $V_{out}$ on rail 104.

PSUs 103-N are also coupled to each other via current sharing bus 105 and/or communication bus 106. In operation, an indication of the output current of each of PSUs 103-N is transmitted through current sharing bus 105 and/or communication bus 106 to other ones of PSUs 103-N. Particularly, each of PSUs 103-N may be configured to output a current sharing signal ($I_{share}$) onto current sharing bus 105 that is indicative of that PSU's output current being supplied to load 102 via bus 104. The amplitude of this signal is proportional to the current supplied by its corresponding PSU.

Additionally or alternatively, each PSU may exchange information with other PSUs using communication bus 106 such as, for example, items such as input current or temperature.

Then, each of PSUs 103-N uses that indication to adjust its output voltage $V_{out}$ to reduce or increase the amount of current being output by that PSU. In various implementations, a voltage control loop and a current sharing loop may be implemented within each PSU, at least in part, by a controller, processor, or logic circuit in combination with a voltage regulator. The adjustment to $V_{out}$ may be achieved, for example, by changing an internal voltage reference ($V_{ref}$) used by the voltage regulator to transform $V_{in}$ into $V_{out}$. The controller, processor, or logic circuit may include or be coupled to a memory having instructions stored thereon that, when executed, cause the PSU to perform one or more techniques described herein.

Figure 2:
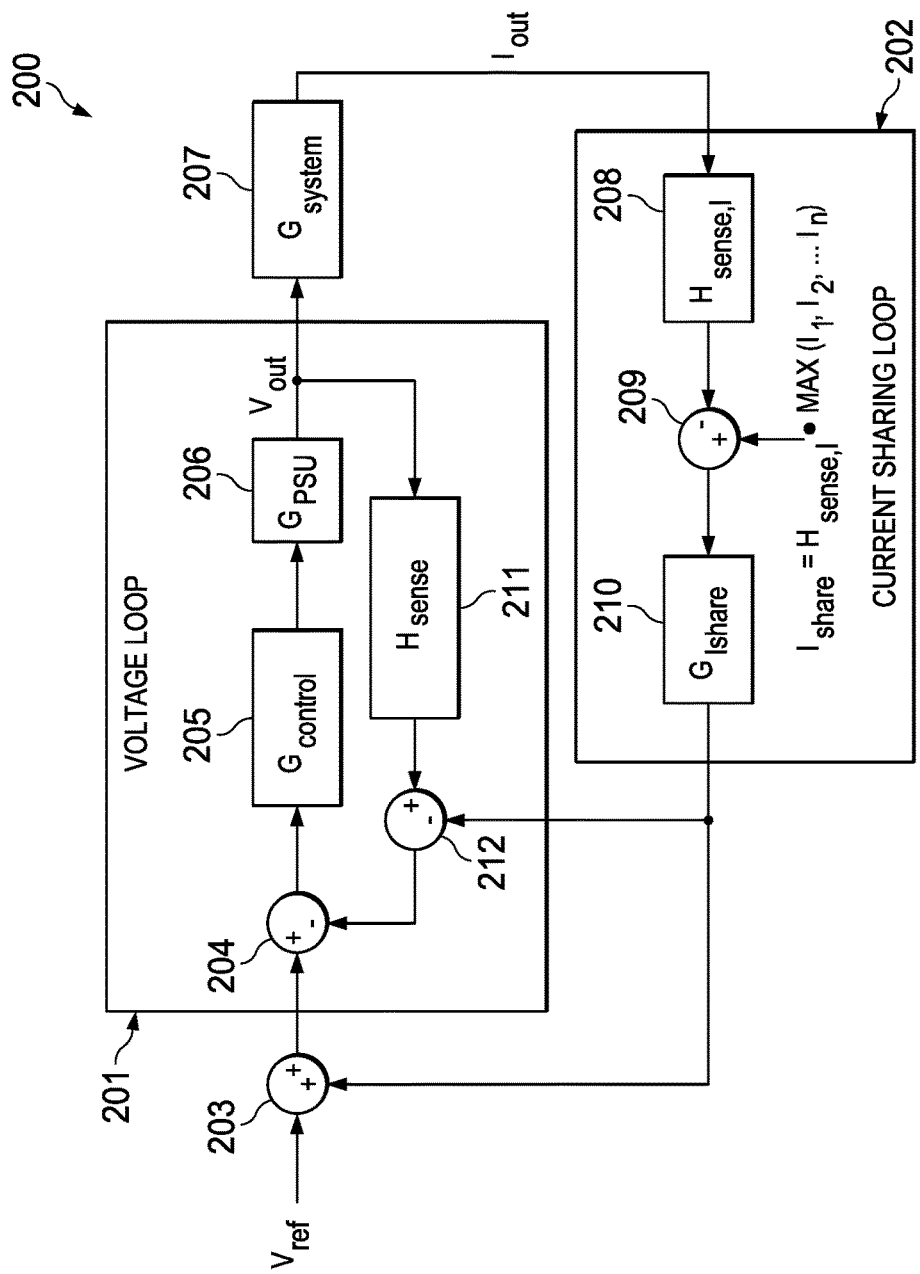
FIG. 2 is a block diagram of an example of a conventional voltage control and current share loop in a PSU.

By way of background, attention is drawn to FIG. 2, which provides an example of a prior art or conventional current sharing system 200, including voltage control loop 201 and current share loop 202. In this case, it is assumed that the current sharing method is master/slave, by which the maximum current among the PSUs multiplied by a scaling factor is used as the reference. The particularly current sharing implementation may use any of suitable technique known in the art.

Generally speaking, an internal voltage reference ($V_{ref}$) used by a voltage regulator inside the PSU is processed by block 205 ($G_{control}$), which expresses a transfer function presented by voltage control loop 201. The output of block 205 is processed by block 206, which represents another transfer function presented by the PSU, and which outputs $V_{out}$ onto a transmission rail or the like. Block 211 ($H_{sense}$) illustrates yet another transfer function expressed by the feedback circuit within loop 201, and voltage control loop regulates $V_{out}$ based, at least in part, upon the value of $V_{ref}$.

After being processed by block 207 ($G_{system}$), which represents a transfer function resulting from the conversion from output voltage $V_{out}$ to output current $I_{out}$, the latter is received by current sharing loop 202. Within current sharing loop 202, block 208 ($H_{sense, i}$) represents a transfer function of the feedback circuit within loop 202. The output of block 208 is applied to an inverting input of summing block 209, which receives current share signal $I_{share}$ (e.g., via current share bus 105) at a non-inverting input. The output of summing block or comparator 209 is processed by block 210, expressing a current share control transfer function.

The output of block 210 is coupled to a non-inverting input of summing block or comparator 203 and to an inverting input of summing block or comparator 212. $V_{ref}$ is coupled to another non-inverting input of summing block or comparator 203, and the output of block 211 is coupled to a non-inverting input of summing block or comparator 212. The output of summing block or comparator 203 is coupled to a non-inverting input of summing block or comparator 204, and the output of summing block or comparator 204 is provided to block 205.

Ultimately, conventional system 200 performs traditional current sharing operations based only upon output current ($I_{out}$). In these cases, $I_{share}$ is given by the transformation of block 208 applied to the maximum value amongst the output currents ($I_1, I_2, \ldots, I_n$) of all PSUs.

However, most modern PSUs utilize digital controllers and associated algorithms. Aside from output current and output voltage information, data such as RMS values for input voltage and input current, bulk capacitor voltage, etc. are also gathered during normal IHS operation. In various embodiments, this data can be used to address aforementioned current sharing problems.

Figure 3:
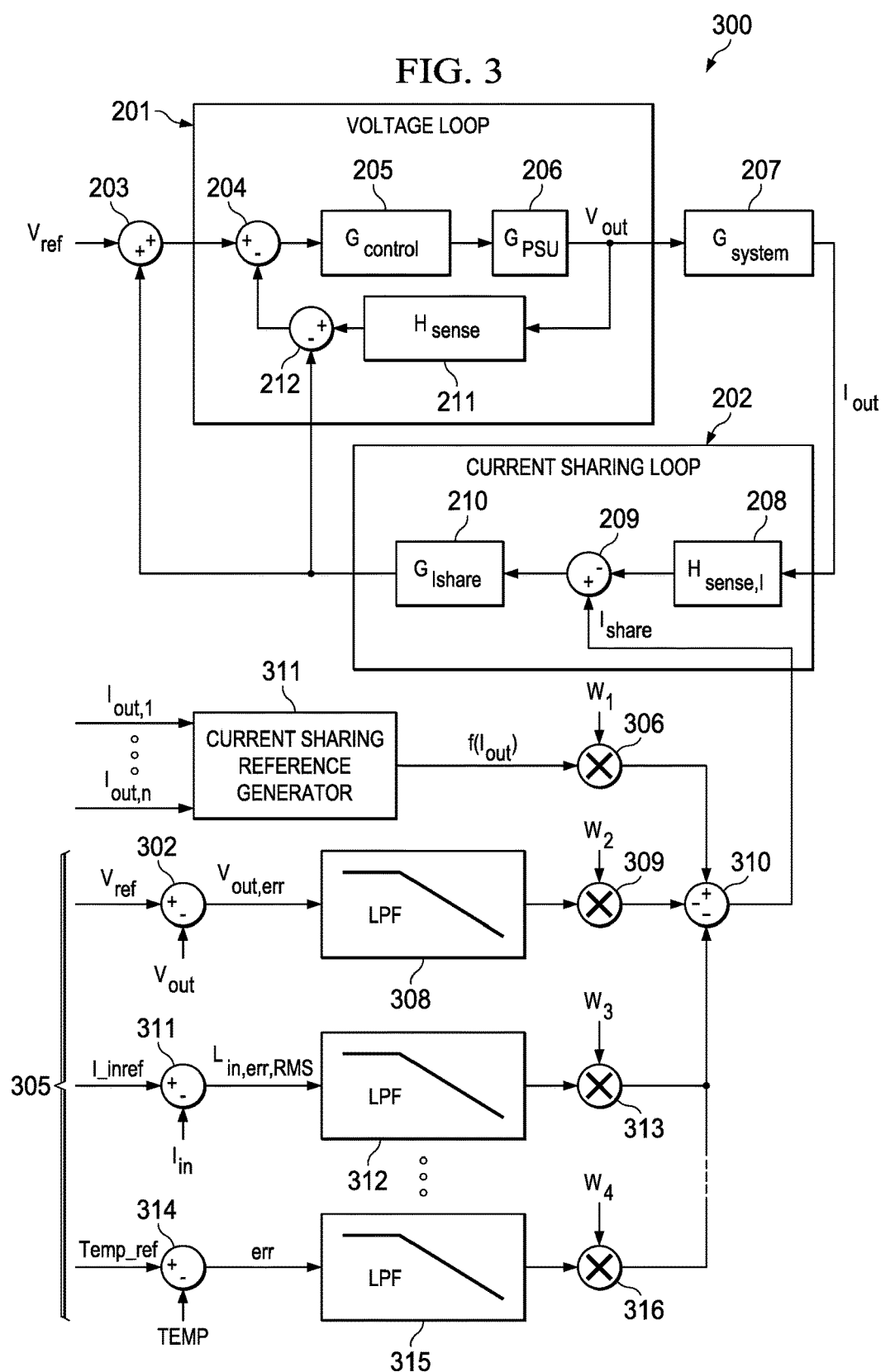
FIG. 3 is a block diagram of an example of a voltage control and current share loop that provide multi-parameter current sharing, according to some embodiments.

Turning now to FIG. 3, a block diagram of an example of system 300 having a voltage control and current share loop that provide multi-parameter current sharing is depicted according to some embodiments. In contrast with conventional system 200 of FIG. 2, the $I_{share}$ term used in system 300 may be determined and updated based upon two or more parameters 305 of the system, each of which may have constantly changing values during normal operation of the system.

For example, a first operational parameter may be a conventional current share signal from the share bus (for example, the average of all PSUs' output currents $I_{out,\ 1}$ through $I_{out,\ n}$, or the maximum value among all of them) that is output by current sharing reference generator 311, and which is then multiplied by a first weighting factor (w1) via multiplier 306. A second parameter may be an error ($V_{out,\ err}$) between an output voltage ($V_{out}$) of the PSU and a reference voltage ($V_{ref}$) internal to the PSU, which is filtered by Low-pass Filter (LPF) 308 and multiplied by a second weighting factor (w2) via multiplier 309.

A third parameter may include an error ($I_{in,\ err,\ RMS}$) between an input current ($I_{in}$) of the PSU and a reference current ($I\_{inref}$) internal to the PSU, which is filtered by LPF 312 and multiplied by a third weighting factor (w3) via multiplier 313. And a fourth parameter may include an error ($_{err}$) between a current temperature (Temp) of the PSU (e.g., the temperature inside the chassis, the temperature of the processor(s), etc.) and a reference temperature ($T\_{ref}$), which is filtered by LPF 315 and multiplied by a fourth weighting factor (w4) via multiplier 316 (for temperature balancing applications, for instance).

These various operational parameters 305, once filtered and multiplied by their respective weighting factors, are combined at summing block 310 to create a configurable, user-adjustable $I_{share}$ signal, which is then used at element 209 of current sharing loop 202. In various embodiments, various filter settings and/or weights may be determined empirically, for example, for each parameter. The relationship between each setting and weight may be stored in the form of one or more tables and/or mathematical expressions, such that the effects of changing the filtering and/or weights are known. By configuring the value of $I_{share}$ signal, an end-user may reduce the effects of stranded power and/or voltage walkup, if so desired, without causing $I_{out}$ to exceed over current protection levels.

Still referring to FIG. 3, $f(I_{out})$ is a function of all the PSUs' output current, which depending on the current sharing method can be a maximum, average, etc. of all of the PSUs' output currents. $V_{out,\ err}$ is an error voltage between the PSU output voltage and the target voltage. Using and/or adjusting this term helps to prevent voltage walkup. $I_{in,\ err,\ RMS}$ is also an error between input and target input current. The target input current may be calculated, for example, by communicating the input current information between the PSUs through PMBus, or a hardware bus line, or calculating the average input current via average output current and associated efficiency value.

The weighting factors can be constructed in a manner that allows the end-user to optimize based on desired performance. As an example, the end-user may want to place a higher weight on input current sharing performance, as opposed to output current sharing performance, and therefore may set third weighting factor w3 to a value greater than first weighting factor w1.

Figure 4:
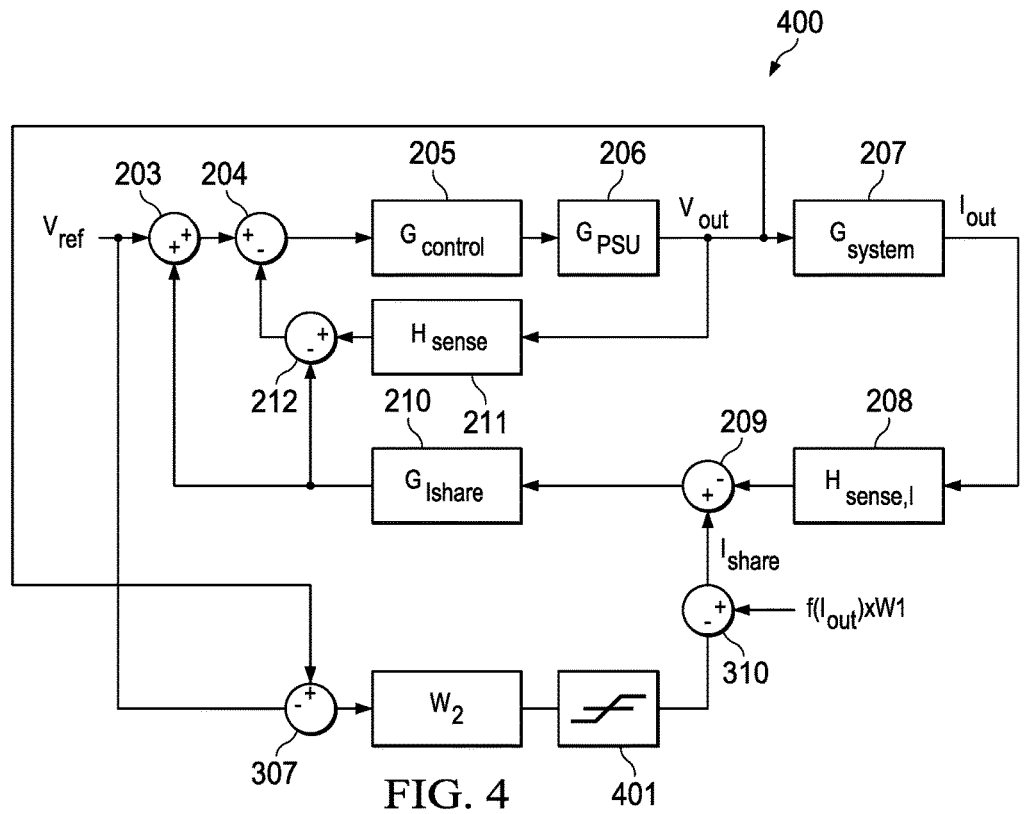
FIG. 4 is a block diagram of an example implementation of the voltage control and current share loop of FIG. 3, according to some embodiments.

FIG. 4 is a block diagram of an example implementation of the voltage control and current share loop of FIG. 3, according to some embodiments. As shown, reference voltage $V_{ref}$ is subtracted from output voltage $V_{out}$ of the PSU via summing block 307, and the resulting error value is multiplied by second weighting factor w2 (LPF 308 is not present in this example), which provides variable offset 401.

Block 401 is a clamping block, and the output of block 401 is referred as the offset, which is then applied to an conventional $f(I_{out})$ (multiplied by first weighting factor w1) via summing block 310 to generate $I_{share}$ signal. The current sharing signal of FIG. 4. The signal output by summing block 310 is then applied as the current sharing signal used by element 209 of current sharing loop 202.

As described above, various embodiments of the systems and methods for providing multi-parameter current sharing described herein may improve input current sharing for phase balancing in 3-Phase distributions, reduce stranded power allowing for an increase in computing power per AC phase, reduce the risk of "voltage walking up" behavior, and/or provides end-user flexibility.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 5:
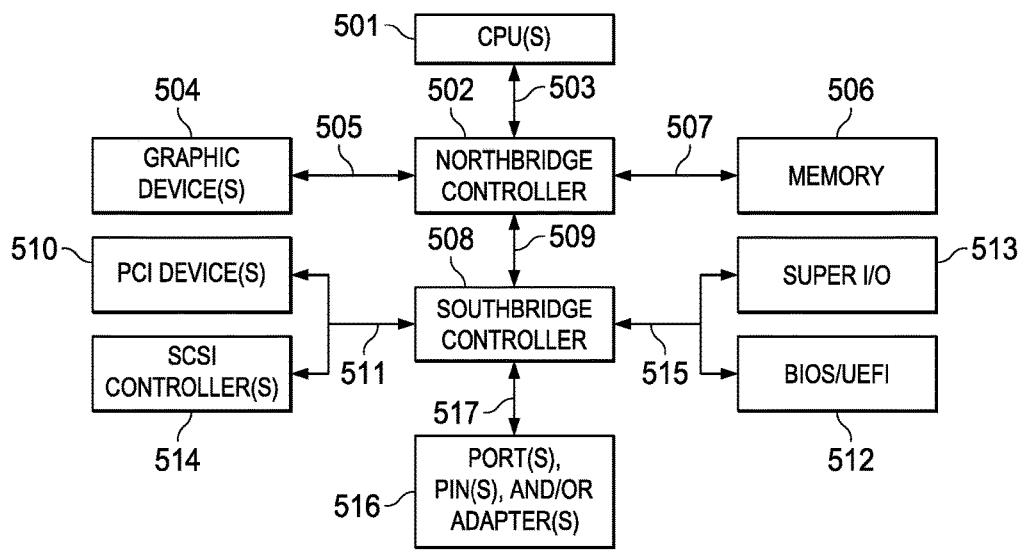
FIG. 5 is a block diagram of an example of an IHS configured to implement systems and methods described herein.

To illustrate this, FIG. 5 shows a block diagram of an example of an IHS according to some embodiments. As depicted, an IHS may include one or more CPUs 501. In various embodiments, an IHS may be a single-processor system including one CPU or a multi-processor system including two or more CPUs (e.g., two, four, eight, or any other suitable number). CPU(s) 501 may include any processor capable of executing program instructions.

For example, in various embodiments, CPU(s) 501 may be general purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 501 may commonly, but not necessarily, implement the same ISA.

In certain embodiments, CPU(s) 501 are coupled to northbridge controller or chipset 501 via front-side bus 503. Northbridge controller 502 may be configured to coordinate I/O traffic between CPU(s) 501 and other components. For example, in the illustrated embodiment, northbridge controller 502 is coupled to graphics device(s) 504 (e.g., one or more video cards or adaptors) via graphics bus 505 (e.g., an Accelerated Graphics Port or AGP bus, a Peripheral Component Interconnect or PCI bus, or the like).

Northbridge controller 502 may also be coupled to system memory 506 via memory bus 507. According to various embodiments, memory 506 may be configured to store program instructions, and/or data accessible by CPU(s) 501. In various embodiments, memory 506 may be implemented using any suitable memory technology, such as static RAM (SRAM), synchronous dynamic RAM (SDRAM), nonvolatile/Flash-type memory, or any other type of memory.

Northbridge controller 502 may be coupled to southbridge controller or chipset 508 via internal bus 509. Southbridge controller 508 may be configured to handle various I/O capabilities supported by an IHS, and it may provide interfaces such as, for instance, Universal Serial Bus (USB), audio, serial, parallel, Ethernet, or the like via port(s), pin(s), and/or adapter(s) 516 over bus 517. For example, southbridge controller 508 may be configured to provide trusted communications between an IHS and remote analytics service.

In various embodiments, southbridge controller 508 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. As described, the I/O capabilities of an IHS may be utilized to interface via a networking protocol with a remote analytics service.

Southbridge controller 508 may also enable connection to one or more keyboards, keypads, touch screens, scanning devices, voice or optical recognition devices, or any other devices suitable for entering or retrieving data. Multiple I/O devices may be present in an IHS. In some embodiments, I/O devices may be separate from an IHS and may interact with an IHS through a wired or wireless connection.

As shown, southbridge controller 508 may be further coupled to one or more PCI devices 510 (e.g., modems, network cards, sound cards, video cards, etc.) and to one or more SCSI controllers 514 via parallel bus 511. Southbridge controller 508 may also be coupled to Basic I/O System (BIOS)/UEFI 512 and to Super I/O Controller 513 via Low Pin Count (LPC) bus 515.

Super I/O Controller 513 may combine interfaces for a variety of lower bandwidth or low data rate devices. Those devices may include, for example, floppy disks, parallel ports, keyboard and mouse, environmental sensors and fan speed monitoring/control, among others.

BIOS/UEFI 512 may include non-volatile memory having program instructions stored thereon. Those instructions may be usable CPU(s) 501 to initialize and test other hardware components and/or to load an Operating System (OS) for operation of an IHS. The BIOS/UEFI 512 initializes and tests the hardware components of an IHS, executes any pre-boot processes, such as Dell ePSA diagnostic processes in certain embodiments, and loads a boot loader or an OS from a memory device. The BIOS/UEFI 512 provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term BIOS, as used herein, is intended also encompass UEFI firmware and future variations thereof.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 500 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, a northbridge controller may be combined with a southbridge controller and/or be at least partially incorporated into the CPU(s). In other implementations, one or more of the devices or components shown in FIG. 5 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises,"

"has," "includes" or "contains" one or more operations possesses those one or more operations but is not limited to possessing only those one or more operations.

The invention claimed is:
1. A system, comprising:
an Information Handling System (IHS); and
a plurality of Power Supply Units (PSUs) coupled to the IHS in a parallel configuration, a given PSU configured to:
receive an indication of an output current provided by the given PSU and available to the IHS via a power transmission interface; and
modify the output current using a current sharing signal calculated based upon two or more parameters of the system, wherein a first parameter includes the output current, multiplied by a first weighting factor, and wherein a second parameter includes an error between an output voltage of the given PSU and a reference voltage internal to the given PSU, multiplied by a second weighting factor different from the first weighting factor.

2. The system of claim 1, wherein a third parameter includes an error between an input current of the given PSU and a reference current internal to the given PSU.

3. The system of claim 2, wherein the third parameter is multiplied by a third weighting factor different from the first and second weighting factors.

4. The system of claim 3, wherein a fourth parameter includes an error between a temperature within the IHS and a reference temperature.

5. The system of claim 4, wherein the fourth error is multiplied by a fourth weighting factor different from the first, second, and third weighting factors.

6. The system of claim 1, wherein the given PSU is further configured to apply a low-pass filter to at least one of the parameters.

7. A hardware memory storage device having program instructions stored thereon that, upon execution by a logic circuit within a Power Supply Unit (PSU) of an Information Handling System (IHS), cause the PSU to:
receive an indication of an output current provided by the PSU and available to the IHS via a power transmission interface; and
modify the output current using a current sharing signal calculated based upon two or more parameters internal to the IHS, wherein a first parameter includes the output current, weighed by a first weight, and wherein a second parameter includes an error between an output voltage of the PSU and a reference voltage internal to the PSU, weighed by a second weight different from the first weight.

8. The hardware memory device of claim 7, wherein a third parameter includes an error between an input current of the PSU and a reference current internal to the PSU multiplied by a third weighting factor different from the first and second weighting factors.

9. The hardware memory device of claim 8, wherein a fourth parameter includes an error between a temperature within the IHS and a reference temperature multiplied by a fourth weighting factor different from the first, second, and third weighting factors.

10. A method performed by a controller within a Power Supply Unit (PSU) of an Information Handling System (IHS), the method comprising:
receiving an indication of an output current provided by the PSU and available to the IHS via a power transmission interface; and
modifying the output current using a current sharing signal calculated based upon two or more parameters internal to the IHS, wherein a first parameter includes the output current multiplied by a first factor, and wherein a second parameter includes an error between an output voltage of the PSU and a reference voltage internal to the PSU, multiplied by a second factor different from the first factor.

11. The method of claim 10, wherein a third parameter includes an error between an input current of the PSU and a reference current internal to the given PSU.

12. The method of claim 10, wherein a third parameter includes an error between a temperature within the IHS and a reference temperature.

* * * * *